(12) United States Patent
Shimizu et al.

(10) Patent No.: US 12,305,741 B2
(45) Date of Patent: May 20, 2025

(54) SPROCKET

(71) Applicant: TSUBAKIMOTO CHAIN CO., Osaka (JP)

(72) Inventors: Shoichiro Shimizu, Osaka (JP); Yuta Watanabe, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 0 days.

(21) Appl. No.: 18/213,350

(22) Filed: Jun. 23, 2023

(65) Prior Publication Data

US 2024/0011549 A1   Jan. 11, 2024

(51) Int. Cl.
*F16H 55/06* (2006.01)
*F16H 55/14* (2006.01)
*F16H 55/30* (2006.01)

(52) U.S. Cl.
CPC ............ *F16H 55/06* (2013.01); *F16H 55/14* (2013.01); *F16H 55/30* (2013.01); *F16H 2055/065* (2013.01); *F16H 2055/306* (2013.01)

(58) Field of Classification Search
CPC ...... F16H 55/30; F16H 7/06; F16H 2055/306; F16H 55/01; F16H 57/0006; F16H 55/06; F16H 2055/065; F16H 2055/086
USPC ......................................................... 474/161
See application file for complete search history.

(56) References Cited

U.S. PATENT DOCUMENTS

| | | | | |
|---|---|---|---|---|
| 975,938 A * | 11/1910 | Downey | ................. | F16H 55/30 474/161 |
| 2,953,930 A * | 9/1960 | Meyer | ...................... | F16H 7/06 474/148 |
| 3,241,391 A * | 3/1966 | Borro, Sr. | ............... | B29C 45/14 74/445 |
| 4,034,616 A * | 7/1977 | Rauscher | ................ | F16H 55/48 474/902 |
| 4,227,422 A * | 10/1980 | Kawashima | .............. | F16H 7/06 198/834 |
| 4,261,214 A * | 4/1981 | Watanabe | ................ | B62M 9/00 474/151 |
| 4,332,574 A * | 6/1982 | Aoyama | ................. | F16H 55/30 474/161 |
| 4,348,199 A * | 9/1982 | Oonuma | ........... | F16H 57/02004 474/151 |
| 4,867,733 A * | 9/1989 | Yamanoi | .................. | F16H 7/06 474/161 |
| 4,894,427 A * | 1/1990 | Yamamoto | ........... | C08G 77/445 528/21 |
| 5,224,903 A * | 7/1993 | Langhof | .................. | B62M 9/08 474/152 |

(Continued)

FOREIGN PATENT DOCUMENTS

JP   2011-256886 A   12/2011

*Primary Examiner* — Henry Y Liu
(74) *Attorney, Agent, or Firm* — WHDA, LLP (57) ABSTRACT

To provide a sprocket that not only reduces impact and hitting noise caused by contact and seating of a chain when it meshes with the sprocket, but also simplifies a setting of process conditions for securing a cushion ring on a side face of a sprocket body. The sprocket includes the sprocket body formed with a plurality of teeth on a circumferential surface thereof, and the cushion ring provided to at least one side face of the sprocket body and having an outer circumferential surface that makes contact with link plates of a chain. The cushion ring is secured to the sprocket body without an adhesive layer.

8 Claims, 7 Drawing Sheets

(56) References Cited

U.S. PATENT DOCUMENTS

| | | | | |
|---|---|---|---|---|
| 5,360,378 A * | 11/1994 | Suzuki | ............... | F16H 7/06 474/161 |
| 5,585,437 A * | 12/1996 | Ohmae | ............... | C08L 101/00 525/397 |
| 5,980,408 A * | 11/1999 | Schulz | ............... | F16H 55/30 474/151 |
| 5,984,817 A * | 11/1999 | Schulz | ............... | F16H 55/30 474/160 |
| 6,179,741 B1 * | 1/2001 | Young | ............... | F16H 55/30 474/160 |
| 6,371,874 B1 * | 4/2002 | Inoue | ............... | F16H 55/30 474/161 |
| 6,652,402 B2 * | 11/2003 | Poiret | ............... | F16H 7/06 474/210 |
| 6,656,072 B2 * | 12/2003 | Sugita | ............... | F16H 55/30 474/160 |
| 6,910,980 B2 * | 6/2005 | Hamilton | ............... | F16H 55/30 474/94 |
| 7,074,147 B2 * | 7/2006 | Young | ............... | F16H 7/06 474/160 |
| 7,824,287 B2 * | 11/2010 | Nonoshita | ............... | B62M 9/10 474/160 |
| 9,145,965 B2 * | 9/2015 | Kwon | ............... | F16H 55/30 |
| 9,933,063 B2 * | 4/2018 | Ognibene | ............... | F16H 55/30 |
| 10,359,107 B2 * | 7/2019 | Young | ............... | F16H 55/30 |
| 10,605,348 B2 * | 3/2020 | Göb | ............... | F16H 7/06 |
| 11,181,171 B2 * | 11/2021 | Ma | ............... | F16H 7/20 |
| 11,268,606 B2 * | 3/2022 | Meder | ............... | F01L 1/022 |
| 11,788,615 B2 * | 10/2023 | Moore | ............... | B22D 25/02 474/152 |
| 2001/0049313 A1 * | 12/2001 | Rutz | ............... | B62D 55/08 474/202 |
| 2002/0096245 A1 * | 7/2002 | Christenson | ............... | F16F 15/1435 156/165 |
| 2002/0169044 A1 * | 11/2002 | Young | ............... | F16H 55/30 474/160 |
| 2003/0176251 A1 * | 9/2003 | Hamilton | ............... | F16H 55/06 474/161 |
| 2003/0199351 A1 * | 10/2003 | Nichols | ............... | B62M 9/10 474/95 |
| 2003/0228950 A1 * | 12/2003 | Young | ............... | F16H 7/06 474/152 |
| 2006/0073927 A1 * | 4/2006 | Haesloop | ............... | F16H 55/30 474/152 |
| 2007/0111833 A1 * | 5/2007 | Young | ............... | F16H 55/30 474/100 |
| 2007/0265122 A1 * | 11/2007 | Emura | ............... | B62M 9/105 474/152 |
| 2008/0221270 A1 * | 9/2008 | Kano | ............... | C08F 255/00 525/63 |
| 2009/0093329 A1 * | 4/2009 | Markley | ............... | F16H 55/30 474/161 |
| 2011/0300977 A1 * | 12/2011 | Hayami | ............... | F16H 55/30 474/161 |
| 2014/0206486 A1 * | 7/2014 | Fuchs | ............... | F16H 55/14 474/152 |
| 2015/0045165 A1 * | 2/2015 | Kwon | ............... | F16H 55/30 474/161 |
| 2015/0087785 A1 * | 3/2015 | Oowada | ............... | C08L 13/00 525/190 |
| 2016/0003340 A1 * | 1/2016 | Crump | ............... | F16H 55/30 474/152 |
| 2016/0153541 A1 * | 6/2016 | Fuchs | ............... | F16H 55/30 474/152 |
| 2017/0067551 A1 * | 3/2017 | Ognibene | ............... | F16H 55/14 |
| 2019/0285148 A1 * | 9/2019 | Ma | ............... | B60K 25/02 |
| 2020/0207425 A1 * | 7/2020 | Grumm | ............... | B62D 29/04 |
| 2020/0216630 A1 * | 7/2020 | Shan | ............... | C08K 9/02 |
| 2022/0250294 A1 * | 8/2022 | Nakamura | ............... | B29C 45/0046 |

* cited by examiner

SPROCKET

BACKGROUND OF THE INVENTION

1. Field of the Invention

The present invention relates to a sprocket with a plurality of teeth on the circumferential surface of the sprocket body for meshing with pins, bushings, or rollers of a chain, and a cushion ring on a side face of the sprocket body for making contact with link plates of the chain on its outer circumferential surface.

2. Description of the Related Art

Chain drive devices transmit power by a chain that is passed around at least two sprockets, with one sprocket being the drive side and the other(s) being the driven side. These devices are widely used, and reducing noise is desirable in all of their applications.

The hitting sound, in particular, which occurs as the chain begins to mesh with the sprocket due to the pins, bushings, or rollers contacting or sitting on the sprocket teeth, is a major noise source, and reducing this noise is an issue with chain drive devices.

Furthermore, the impact that occurs at the onset of meshing, where the pins, bushings, or rollers make contact with or sit on the sprocket teeth, is the cause of vibration. This impact can also cause damage and wear of the chain and sprocket, which may compromise their durability.

A sprocket designed to reduce the impact and hitting noise caused by the contact and seating of the chain when it meshes with the sprocket is known (see, for example, Japanese Patent Application Publication No. 2011-256886). The sprocket body has a plurality of teeth on its circumferential surface that mesh with pins, bushings, or rollers of the chain. Additionally, cushion rings with an outer circumferential surface that makes contact with the link plates of the chain are provided on the side faces of the sprocket body.

SUMMARY OF THE INVENTION

Typically, cushion rings are made of thermosetting resins such as vulcanized rubber. Attaching a rubber cushion ring securely on the side face of a metal sprocket body requires specific conditions, which can be difficult to set. To attach the cushion ring, the target component is cleaned first to remove any foreign matter from its surface. The component is then surface-treated through a process such as sandblasting. After that, vulcanizing adhesive is applied to the sprocket body. The cushion ring is molded and simultaneously vulcanized in a metal mold as heat is applied. Settings of the process management for these pre-processing for adhesive application, bonding, and vulcanization molding can be challenging. After vulcanization and molding, the component is demolded, and burrs are removed. This burr removal process is time-consuming, because burrs can easily form at the mold interface (or between the mold and other structures) during the vulcanization molding process using a thermosetting resin. Therefore, the production process of cushion rings made of thermosetting resin such as rubber can be cumbersome and time-consuming.

Another issue is that thermosetting resins such as rubber cannot be reused and result in increased material waste. Specifically, during molding, the entire cushion ring is cured, including the runner portions that lead to spools or gates, which must be discarded.

The present invention was made under the circumstances described above, and it is an object of the invention to provide a sprocket that not only reduces the impact and hitting noise caused by the contact and seating of the chain when it meshes with the sprocket, but also simplifies the setting of process conditions for securing the cushion ring on a side face of the sprocket body.

To achieve the above object, the sprocket according to the present invention includes a sprocket body formed with a plurality of teeth on a circumferential surface thereof, and a cushion ring provided to at least one side face of the sprocket body and having an outer circumferential surface that makes contact with link plates of a chain. The sprocket is characterized in that the cushion ring is secured to the sprocket body without an adhesive layer.

The cushion ring of the sprocket, according to the present invention, secured to the sprocket body without an adhesive layer, not only reduces the impact and hitting noise caused by the contact and seating of the chain when it meshes with the sprocket, but also simplifies the setting of process conditions for securing the cushion ring on the side face of the sprocket body.

The cushion ring is preferably made of thermoplastic resin. The cushion ring made of thermoplastic resin can be secured to the sprocket body without the need for an adhesive.

Preferably, the sprocket body includes a side face recessed portion that is set back from the side face and filled with the thermoplastic resin. The side face recessed portion can not only help secure the cushion ring firmly, but also enhance the damping effect.

Preferably, the side face recessed portion is a through hole that extends through both side faces of the sprocket body. The through hole can not only help secure the cushion ring firmly, but also enhance the damping effect.

Preferably, the sprocket body has the cushion ring on both side faces thereof, as well as the through hole extending through both side faces, so that the cushion rings are connected to each other via the thermoplastic resin that filled the through hole. The cushion rings can be firmly secured by being connected to each other via the thermoplastic resin that filled the through hole, and also enhance the damping effect.

Preferably, a plurality of through holes should be provided. A plurality of through holes can not only help secure the cushion ring firmly, but also enhance the damping effect.

Preferably, the through hole should be located at the circumferential position that matches the gate hole in the mold, which is formed for injecting the thermoplastic resin into the mold. A through hole located at the circumferential position that matches the gate hole of the mold can be filled with the thermoplastic resin favorably. When cushion rings are provided on both side faces of the sprocket body, the through hole allows the thermoplastic resin to flow efficiently through to the back side, resulting in a more favorable filling of the through hole.

A particularly favorable thermoplastic resin is polyester resin.

Preferably, a boss is continuously formed to the sprocket body and includes a boss recessed portion that is set back from the outer circumferential surface of the boss and filled with the thermoplastic resin. The boss recessed portion filled with the thermoplastic resin can not only help secure the cushion ring firmly, but also enhance the damping effect.

Preferably, the boss recessed portion and the side face recessed portion are continuous. The side face recessed portion and the boss recessed portion filled with the thermoplastic resin can not only help secure the cushion ring firmly, but also enhance the damping effect.

The sprocket according to the present invention not only reduces the impact and hitting noise caused by the contact and seating of the chain when it meshes with the sprocket, but is easy to produce since the cushion ring is secured to the side face of the sprocket body without an adhesive layer.

DESCRIPTION OF THE PREFERRED EMBODIMENTS

Hereinafter one embodiment of the sprocket according to the present invention will be described with reference to the drawings. In the following embodiment, the same constituent elements will be distinguished from one another, when necessary, by adding alphabets to reference numerals based on their positions.

As shown in FIGS. 1 to 3, 4A, and 4B, the sprocket 100 according to a first embodiment of the present invention includes a sprocket body 101 formed with a plurality of teeth 110, each having a tooth tip 111 and a tooth root 112, cushion rings 120 (120A and 120B) provided to both side faces 102 of the sprocket body 101 and having a cylindrical outer circumferential surface that makes contact with link plates of the chain, and bosses 103 extended from the sprocket body 101.

Figure 1:
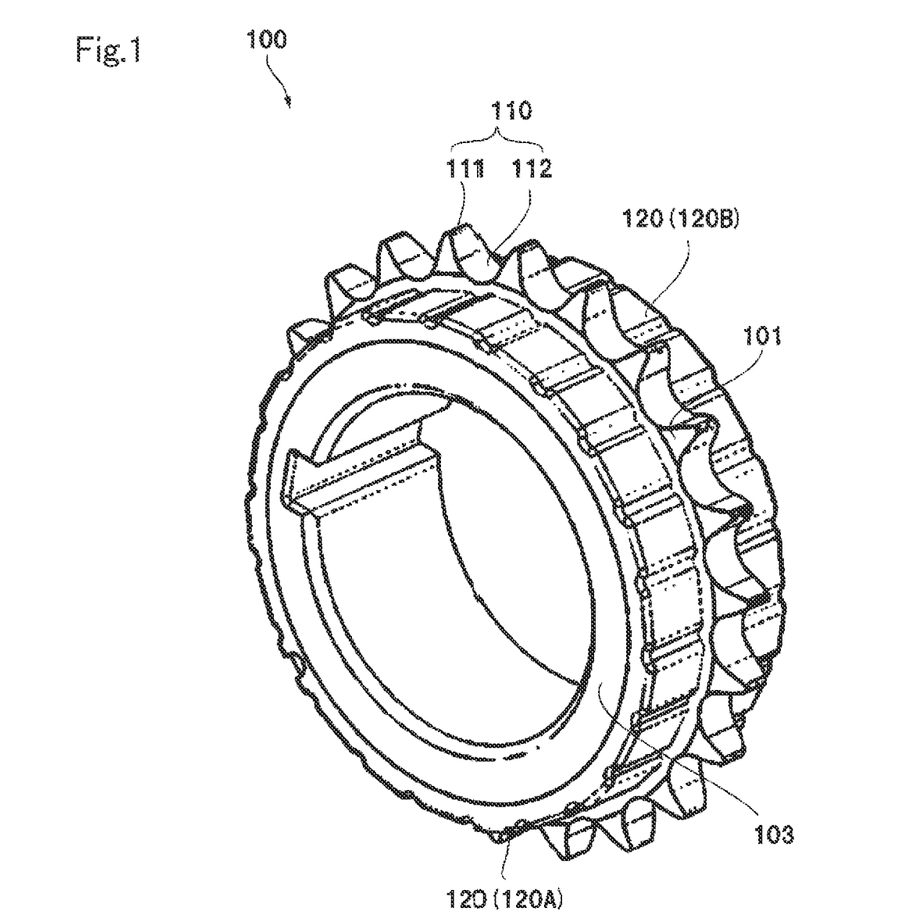
FIG. 1 is a perspective view illustrating a schematic configuration of a sprocket according to the present invention.
Figure 2:
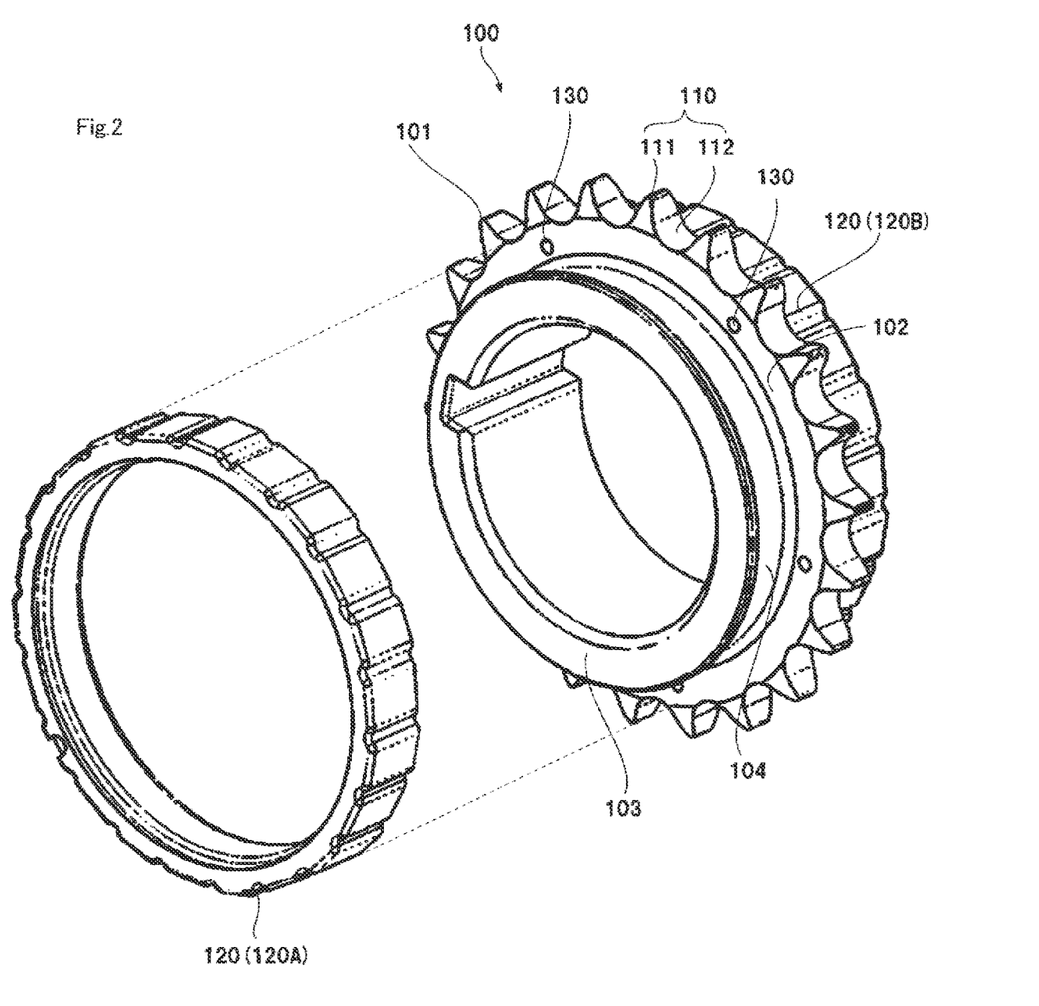
FIG. 2 is an exploded perspective view illustrating the relationship between the body of the sprocket shown in FIG. 1 and a cushion ring.
Figure 3:
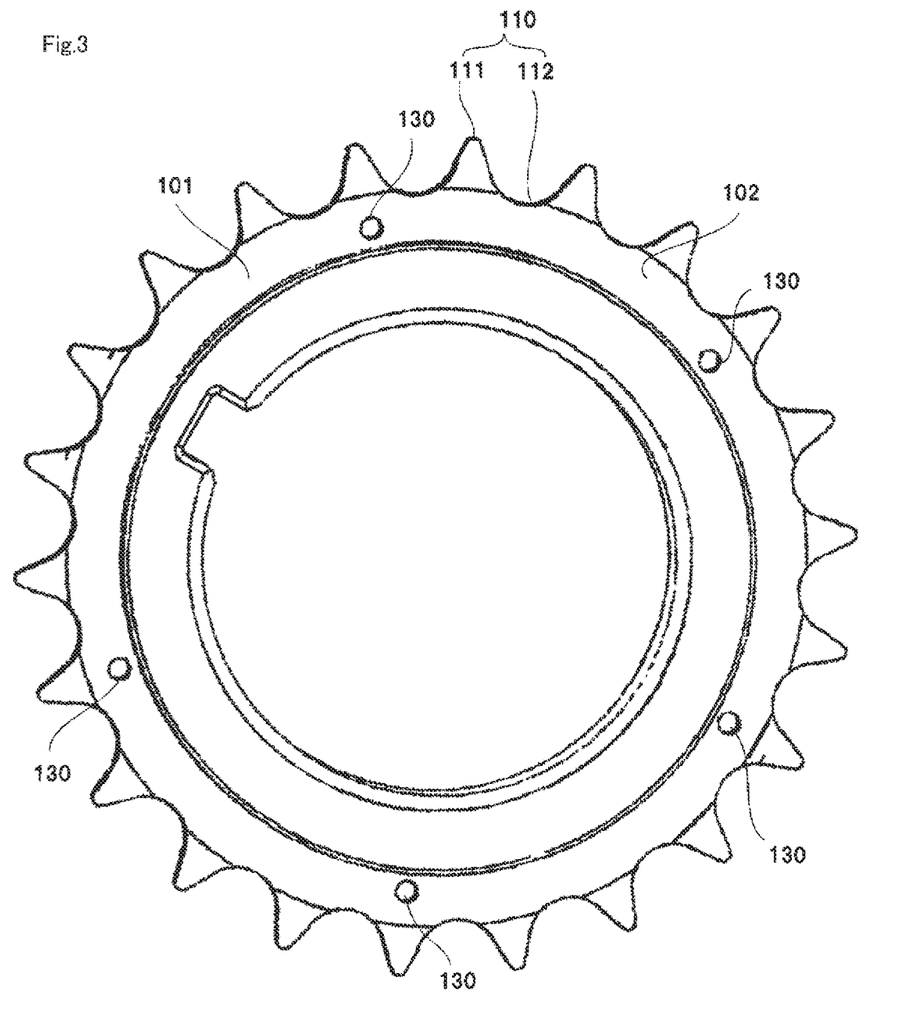
FIG. 3 is a front view of the sprocket body shown in FIG. 1.

The cushion ring 120 is in tight contact with and fixed to the side face 102 without any adhesive layer. The cushion ring 120 is also in tight contact with the outer circumferential surface 104 of the boss 103. The sprocket body 101 of this embodiment may be made of any of metals such as steel, ceramics, resins, or composite materials of any combination of these.

In this embodiment, the cushion ring 120 is made of thermoplastic resin. It is preferable to use a thermoplastic resin with high creep resistance and rubber elasticity. The use of thermoplastic resin enables recycling of the runner parts leading to the spool or gate, resulting in improved resource efficiency. Note, the term "resin" as used herein includes both rubber and elastomer. A preferable thermoplastic resin would exhibit high heat resistance (for example, 100° C. or higher), excellent oil resistance or low volume change ratio after an oil resistance test (for example, 50% or lower, preferably 30% or lower), and low compressive strain (for example, 80% or lower). Polyester resins, in particular, polyester elastomers, are among these preferable thermoplastic resins. Examples of preferred polyester elastomers include thermoplastic elastomers made from polybutyleneterephthalate (PBT: $(C_{12}H_{12}O_4)n$) and polyether, as well as thermoplastic elastomers composed of acrylic rubber and polyolefin or polyester. In this embodiment, a thermoplastic elastomer composed of acrylic rubber and polyester is used (NOF®-ALLOY TZ660 produced by NOF CORPORATION). This thermoplastic elastomer exhibits heat resistance of 150° C. or higher, oil resistance of 10% or lower (after immersed in IRM903 oil at 150° C. for 72 hours), and compressive strain of 60% or lower (with a compression ratio of 25% at 150° C. after 24 hours), and thus can be used favorably.

Conventional rubber cushion rings were secured to the sprocket body through a vulcanization molding process, after sandblasting and applying adhesive to the sprocket body. This embodiment uses a thermoplastic resin with a higher contraction ratio than rubber for the cushion ring 120, which allows the cushion ring 120 to be secured to the sprocket body 101 without using adhesive. Therefore, the pre-processing for adhesive application and the bonding process are not necessary. The cushion ring 120 made of thermoplastic resin can provide the cushioning properties and help reduce noise and vibration over a longer period of time than rubber.

Unlike thermosetting resins like rubber, the use of thermoplastic resin as the material for the cushion ring 120 allows for material recycling. Furthermore, thermoplastic resins are temperature-dependent, as well as resistant to heat-aging and oil, which allows them to withstand the harsh conditions inside the engine. This makes thermoplastic resins highly resistant to deformation, providing another reason why thermoplastic resins are a favorable choice for this application.

Unlike rubber cushion rings, which require a long processing time for molding and vulcanization, the cushion ring 120 according to this embodiment is formed through a shorter injection molding process as will be described later. There is no need for setting complex process conditions required for vulcanization molding. Molding and vulcanization of rubber cushion rings result in the formation of numerous burrs at the mold interface. On the other hand, thermoplastic cushion rings 120 produced by injection molding result in few, if any, burrs. This means that the time required for burr removal can be significantly shortened.

Through holes 130 are formed in the side faces 102 of the sprocket body 101, each extending through the side faces 102. These through holes 130 are used when forming the cushion ring 120 in this embodiment, which will be described in detail later.

The through holes 130 are circular as viewed from the front. In this embodiment, five through holes 130 are formed. The shape and the number of the through holes 130 are not particularly limited, and may be set depending on the type of the thermoplastic resin used for the cushion ring 120 as will be described later. For example, in the case of a thermoplastic resin that exhibits low flowability (high viscosity) when heated, the hole diameter may be increased to facilitate the flow of resin over to the mold 200B side. Additionally, larger diameter through holes 130 can result in a more robust connecting part 121 (to be described later) for a firmer connection between the cushion rings 120A and 120B.

Now the process of forming the cushion rings 120 on both side faces 102 of the sprocket body 101 is described.

Figure 4A:
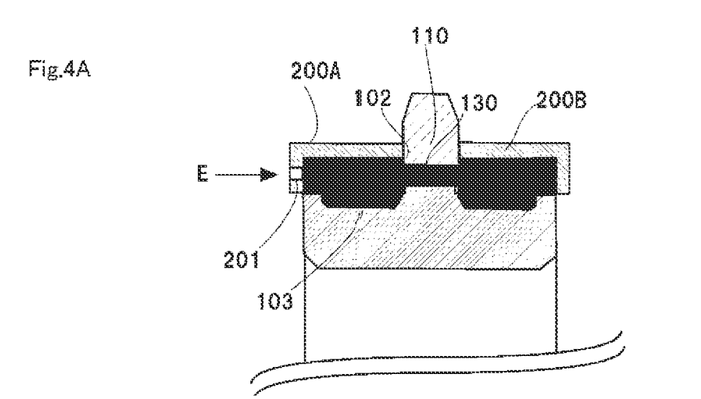
FIG. 4A is a cross-sectional view around a through hole in the sprocket during a molding process.

A molding process is performed first. The molding process is a thermoplastic resin injection molding process. In the molding process, as shown in FIG. 4A, molds 200A and 200B are set on both side faces 102 of the sprocket body 101. These molds are configured to conform to a desired shape of the cushion ring 120. The molds 200 are open on the side faces 102 and the side that contacts the outer circumferential surfaces 104 of the bosses 103. A gate hole 201 is formed in the mold 200A. This gate hole 201 is positioned at the same circumferential location as one through hole 130. That is, each through hole 130 formed in the sprocket body 101 is located opposite the gate hole 201 as viewed from the front.

Heated and molten thermoplastic resin E is injected through the gate hole(s) 201 into the mold 200A. Without a gate hole 201 leading to the mold 200B, the molten thermoplastic resin cannot flow directly into the mold 200B. Nevertheless, the thermoplastic resin E flows from the mold 200A side over to the mold 200B side through the through hole 130. The through holes 130 thus allow injection of thermoplastic resin E into the molds 200 from a single side, filling the molds 200 with the thermoplastic resin E.

In this embodiment, the through holes 130 are positioned opposite to the respective gate holes 201 to allow the thermoplastic resin E flowing in from the gate holes 201 to easily flow from the mold 200A side over to the mold 200B side through the through holes 130. The design of the sprocket body 101 is not limited to the through holes 130 being located opposite the corresponding gate holes 201 as shown in this embodiment. If there is at least one through hole 130, there is no need to directly inject the molten thermoplastic resin E into the mold 200B. Furthermore, if at least one through hole 130 is located opposite the gate hole 201, the thermoplastic resin E can easily flow from the mold 200A side over to the mold 200B side via the through hole 130.

Figure 4B:
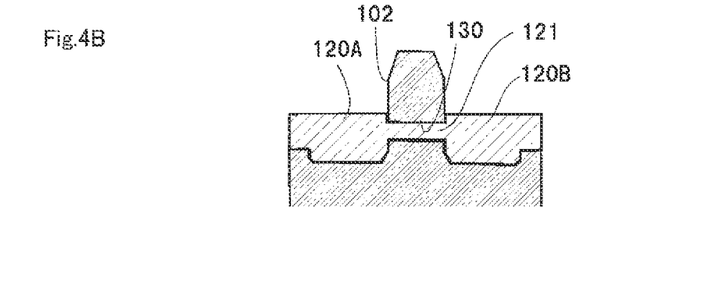
FIG. 4B is a cross-sectional view around a through hole in the sprocket during a molding process.

The molten thermoplastic resin E, injected into the molds 200 as described above, is then allowed to cool and solidify, resulting in the attachment of the cushion rings 120 to the sprocket body 101. After the formation of the cushion rings 120, the molds 200 are opened, and burrs, if any, are removed. As a result, cushion rings 120 made of thermoplastic resin are formed and simultaneously secured to the sprocket body 101 as shown in FIG. 4B. In this embodiment, as described above, cushion rings 120 can be formed simultaneously on both side faces 102 of the sprocket body 101 by providing the through hole(s) 130.

As the thermoplastic resin E flows from the mold 200A side over to the mold 200B side via the through holes 130, the resin fills the through holes 130 and forms connecting parts 121 inside the through holes 130, made of the same thermoplastic resin E as the cushion rings 120. The connecting parts 121 are integrally joined to both cushion rings 120 on side faces 102. That is, the cushion ring 120A and cushion ring 120B are connected via these connecting parts 121. The cushion rings 120A and 120B joined by the connecting parts 121 formed inside the through holes 130 as described above help attach the cushion rings 120 more firmly to the sprocket body 101. This can further reduce noise and vibration.

When the molds 200 are opened, the solidified thermoplastic resin is cut at the gate holes 201, leaving protruded cut marks in the form of the gate holes 201 on the surface of the cushion ring 120A. This protrusion can be utilized as positioning marks when attaching the sprocket 100 of this embodiment to a crankshaft, for example.

The present invention is not limited to the embodiment described above. For example, the cushion rings 120 do not necessarily have to be provided to both side faces of the sprocket body 101 as described above, and may be provided on at least one side face 102. In this case, the through holes 130 will function as air holes during the injection molding. As long as the cushion ring 120 can be secured to a side face 102 of the sprocket body 101 without an adhesive layer, materials other than thermoplastic resin may also be used.

Figure 5:
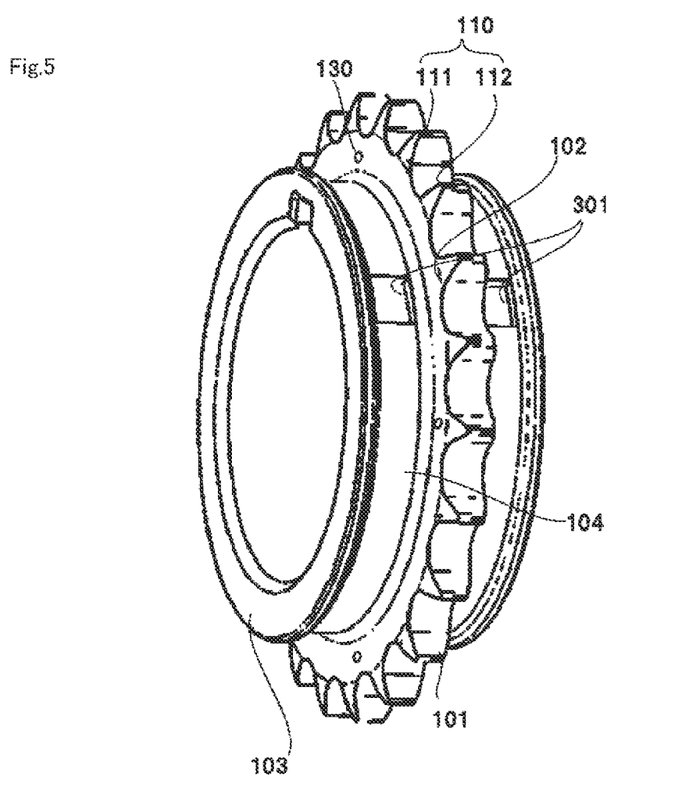
FIG. 5 is a perspective view illustrating another sprocket body.

To enhance the damping effect of the cushion ring 120, the boss 103 may be provided with a recessed portion 301 that is set back from the outer circumferential surface 104 of the boss 103, as shown in FIG. 5. The cushion rings 120 will firmly fit in these recessed portions 301 and therefore be secured more firmly, which will minimize vibration and enhance the damping effect. While the recessed portions 301 in the illustrated variation example in FIG. 5 are opposite to each other, they may be displaced from each other. The recessed portions 301 may be provided at a plurality of locations. Similarly, a recessed portion (side face recessed portion) may be provided on the side face 102 of the sprocket body 101, which is set back from the side face 102 and filled with the thermoplastic resin. In this case as well, the cushion ring 120 will fit firmly into the side face recessed portion and be secured more firmly. Furthermore, the increased thickness will help minimize vibration and enhance the damping effect. Alternatively, for example, the sprocket body 101 may have only one cushion ring 120, with only side face recessed portions on the side face 102 and no through holes 130.

Figure 6A:
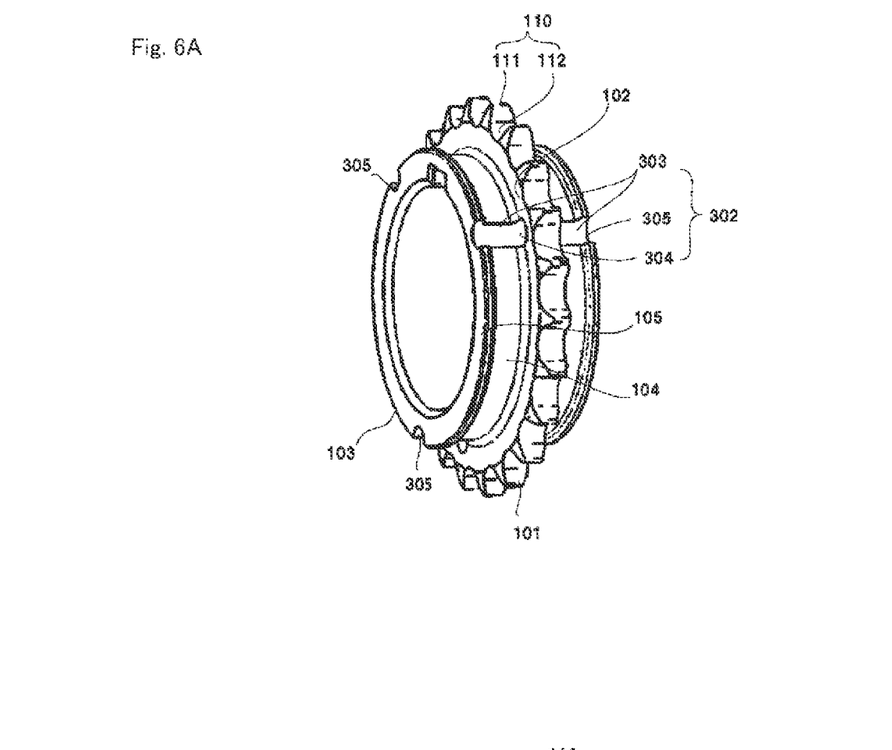
FIG. 6A is a perspective view illustrating another sprocket body.
Figure 6B:
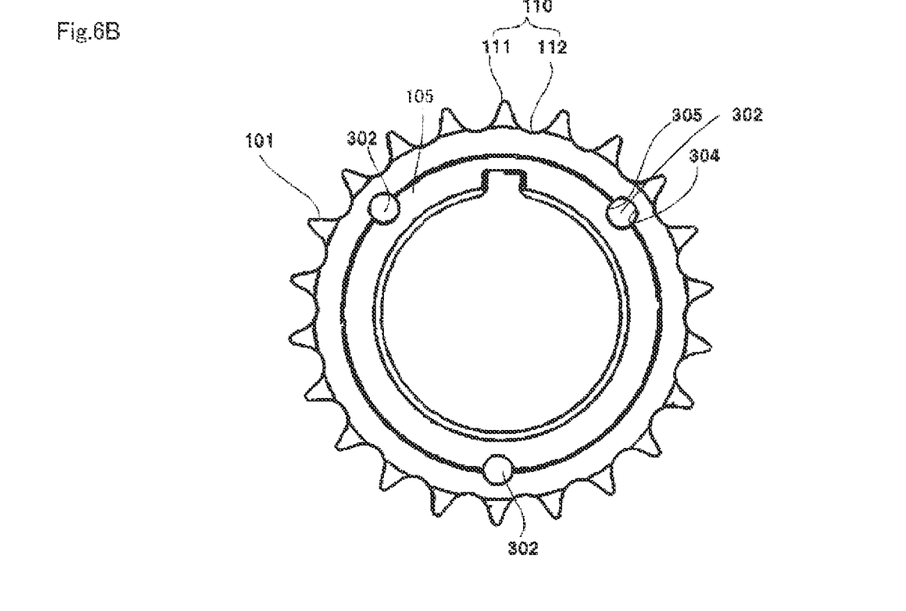
FIG. 6B is a front view illustrating another sprocket body.

To enhance the damping effect of the cushion ring 120, the recessed portions 301 shown in FIG. 5 can be formed continuously with the through holes 130. In the variation example shown in FIGS. 6A, 6B, and 7, through grooves 302 are formed on the sprocket body 101. The through groove 302 extends across the outer circumferential surface 104 of the bosses 103 and flange parts 105 on both sides of the sprocket body 101. More specifically, the through groove 302 is composed of a groove 303 that is set back from the outer circumferential surface 104 of the boss 103, a hole 304 that is continuous with the groove 303 and extends through the sprocket body 101, and a notch 305 continuous with the groove 303 and set back from the flange part 105. While the variation example shown in FIGS. 6A, 6B, and 7 has three through grooves 302 on the sprocket body 101, the number of grooves is not limited.

Figure 7:
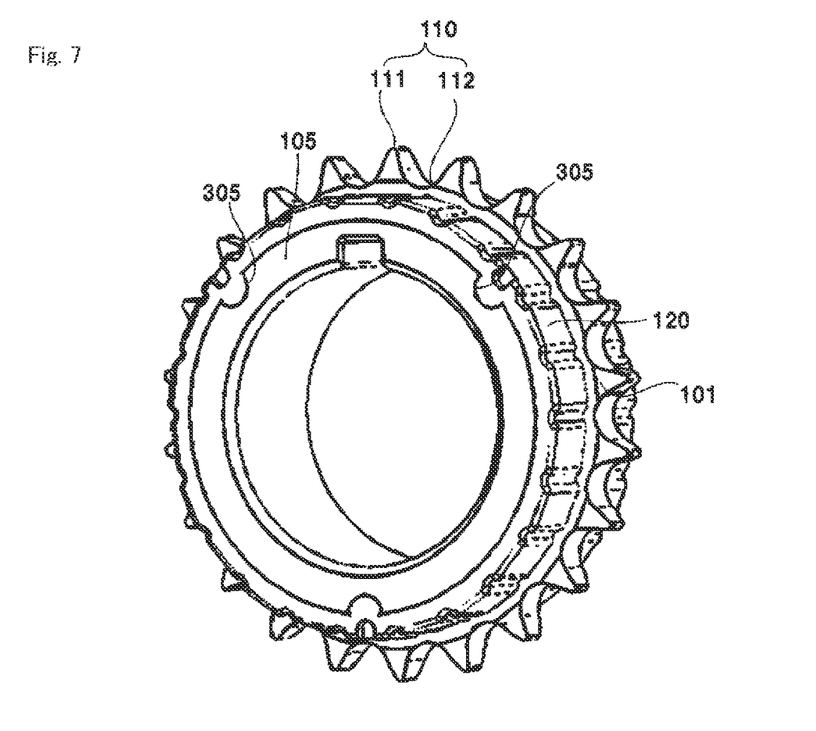
FIG. 7 is a perspective view illustrating another sprocket.

If such through grooves 302 are formed, the thermoplastic resin will also fill these through grooves 302 as shown in FIG. 7 when the cushion rings 120 are formed. In this case, the parts corresponding to the through holes 130 in the embodiment described above and shown in FIG. 5 will be made larger, resulting in a firmer attachment of the cushion rings 120 to the sprocket body 101 and a better damping effect. While the through groove 302 in the variation example shown in FIGS. 6A, 6B, and 7 includes the hole 304, the through groove may be composed of the side face recessed portion described above instead of such a hole that extends through the sprocket body 101.

The description of the embodiment and variation examples above are provided merely for ease of understanding of the present invention and not intended to limit the scope of the present invention. Accordingly, the elements disclosed in the embodiment and variation examples above are intended to include all the design changes and equivalents within the technical scope of the present invention.

What is claimed is:

1. A sprocket comprising a sprocket body with a plurality of teeth on a circumferential surface thereof, and a cushion ring on at least one side face of the sprocket body,
the cushion ring having an outer circumferential surface for making contact with link plates of a chain, and secured to the sprocket body without an adhesive layer, wherein the cushion ring is made of a thermoplastic resin which comprises a polyester elastomer composed of acrylic rubber and polyester,
wherein the sprocket body comprises
a boss continuously formed at the at least one side face of the sprocket body and having an outer circumferential surface and a boss recessed portion that is set back from the outer circumferential surface, and
a through hole formed at the at least one side face of the sprocket body, and
wherein the boss recessed portion and the through hole are continuously formed extending through the at least one side face of the sprocket and filled with the thermoplastic resin of the cushion ring.

2. The sprocket according to claim 1, wherein the sprocket body includes a side face recessed portion that is set back from the side face and filled with the thermoplastic resin.

3. The sprocket according to claim 2, wherein the side face recessed portion is a through hole that extends through both side faces of the sprocket body.

4. The sprocket according to claim 3, wherein the sprocket body has the cushion ring on both side faces thereof, as well as the through hole extending through the both side faces, so that
the cushion rings are connected to each other via the thermoplastic resin that filled the through hole.

5. The sprocket according to claim 3, wherein the through hole is formed in plurality.

6. The sprocket according to claim 2, wherein the through hole is located at a circumferential position that matches a gate hole formed in a mold, which is formed for injecting the thermoplastic resin into the mold.

7. The sprocket according to claim 2, wherein the boss recessed portion and the side face recessed portion are continuous.

8. The sprocket according to claim 1, wherein the boss recessed portion and the through form a through groove extending in an axial direction of the sprocket.

* * * * *